March 14, 1939. W. E. BUCHANAN Re. 21,028

METHOD AND APPARATUS FOR JOINING WIRE CLOTH

Original Filed May 14, 1934 4 Sheets-Sheet 1

WITNESSES
L. E. Kilian
E. L. Waal

INVENTOR
William E. Buchanan
By R. S. Caldwell
ATTORNEY

March 14, 1939. W. E. BUCHANAN Re. 21,028

METHOD AND APPARATUS FOR JOINING WIRE CLOTH

Original Filed May 14, 1934 4 Sheets-Sheet 2

WITNESSES
L. E. Kilian
C. L. Waal

INVENTOR
William E. Buchanan
By R. S. Caldwell
ATTORNEY

March 14, 1939. W. E. BUCHANAN Re. 21,028

METHOD AND APPARATUS FOR JOINING WIRE CLOTH

Original Filed May 14, 1934 4 Sheets-Sheet 3

WITNESSES
L. E. Kilian
E. L. Maal

INVENTOR
William E. Buchanan
By R. S. Caldwell
ATTORNEY

March 14, 1939. W. E. BUCHANAN Re. 21,028

METHOD AND APPARATUS FOR JOINING WIRE CLOTH

Original Filed May 14, 1934 4 Sheets-Sheet 4

WITNESSES

L. E. Kilian

E. L. Waal

INVENTOR

William E. Buchanan

By R. S. Caldwell

ATTORNEY

Reissued Mar. 14, 1939 Re. 21,028

UNITED STATES PATENT OFFICE 21,028

METHOD AND APPARATUS FOR JOINING WIRE CLOTH

William E. Buchanan, Appleton, Wis., assignor to Appleton Wire Works, Inc., Appleton, Wis., a corporation of Wisconsin Original No. 2,078,369, dated April 27, 1937, Serial No. 725,559, May 14, 1934. Application for reissue July 23, 1938, Serial No. 221,027

29 Claims. (Cl. 140—3)

The invention relates to a method and apparatus for producing joints or seams in wire cloth or fabric for paper machines or other uses.

It has heretofore been proposed to join the end edges of wire cloth by the application of heat, as by soldering, brazing, or welding, to thereby obviate the use of a laced seam.

An object of the present invention is to provide a method of bringing the edges of the cloth forcibly and accurately into abutment with each other or with an interposed strand, so that they may be firmly joined by the application of heat, and a more specific object is to effect the abutment and heating by a continuous progressive operation.

Another object of the invention is to provide an apparatus for producing the joint comprising a carriage which travels along the adjacent end portions of the cloth for bringing the cloth edges into abutment, the carriage supporting heating means for the joint and also having means for guiding a strand to be interposed between the cloth edges.

A further object is to provide simple but effective means for clamping the cloth and for guiding the carriage.

A further object is to provide easily controlled means for bringing into register the selvage edges of the cloth at the finishing end of the joint and for avoiding waviness at the joint.

The invention further consists in the several features hereinafter described and claimed.

In the accompanying drawings.

Figure 17:
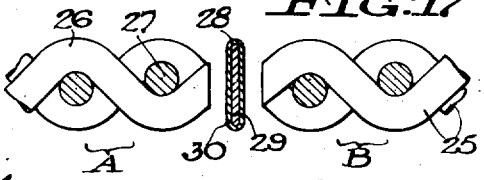
Fig. 17 is a transverse sectional view of cloth ends and interposed solder-bearing strand for producing one form of joint.
Figure 18:
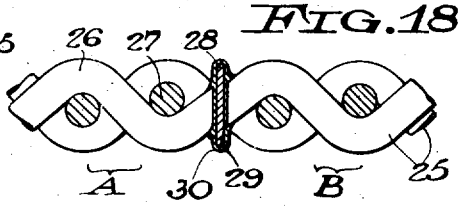
Fig. 18 is a transverse sectional view of the completed joint.
Figure 20:
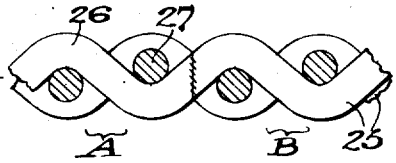
Fig. 20 is a transverse sectional view of another form of cloth joint which is welded.

In these drawings, 25 designates a length of wire cloth or fabric, the ends A and B of which are to be joined to form an endless belt, such as a Fourdrinier wire. In trimming the ends of the cloth preparatory to forming the joint, the warp wires 26 of the ends A and B (Figs. 17 and 18) are cut along a line parallel to the weft wires 27, preferably about midway between adjacent weft wires. The end edges of the cloth are to be joined by the application of heat, as by soldering, brazing, or welding. A soldered or brazed joint is shown in Fig. 18, while Fig. 20 shows a welded joint. In the case of soldering, a solder-bearing strand or strip 28 is preferably interposed between the spaced end edges of the cloth, as seen in Fig. 17. The strand may be formed in whole or in part of a suitable fusible metal, such as silver solder, and is preferably in the form of a ribbon having a core or carrier 29 of relatively infusible metal with a coating or facing 30 of fusible metal. Obviously, the ribbon may be formed by separate laminations, if desired. The fusible metal preferably constitutes the greater part of the ribbon. The width of the ribbon is substantially perpendicular to the plane of the cloth, and is here shown to be about equal to the thickness of the cloth, at least one edge of the ribbon in the finished joint presenting a wearing surface, as seen in Fig. 18. The strand may also have other cross-sectional shapes, such as circular, oval, or polygonal. In the case of a welded joint, an interposed strand may or may not be used. Instead of cutting both sets of warp ends long, one set may be cut short, and in some instances both sets may be cut short.

In carrying out the method of the invention, the cloth ends are urged toward each other to bring the edge faces thereof into firm abutment with each other or with opposite faces of the interposed strand, and heat is applied to the abutting portions to produce a strong durable joint. In the method, the cloth edges are brought forcibly together in a continuous progressive operation, only small portions of the cloth ends being abuted at any instant so as to avoid any loose warp ends, and the abutted portions of both ends being immediately subjected to a continuous progressive heating operation to produce the joint.

Referring to the drawings showing a form of apparatus suitable for use in conjunction with the method, the numeral 31 designates a flat-topped table for supporting the wire cloth 26, the ends A and B of which are brought near the front edges of the table.

A movable beam 32 forming a support rests on one end portion of the cloth near and parallel to the front edge of the table, and is provided with trunnions 33 at opposite ends for facility in handling and for entering vertically slotted locating brackets 34 and 35 secured to opposite end portions of the table, the bracket 34 being hinged to the table. The beam 32 is of composite construction and comprises parallel front and rear stringers 36 and 37 joined by a bottom plate 38, the front stringer 36 having a rounded front edge. An H-beam 39 is secured to the bottom plate 38 and front stringer, and at its top is rigidly connected to both stringers by flat horizontal metal plates 40 and 41 which are flush with the top faces of the stringers and together form a flat support for the fabric to be joined, which support is continuous, extending entirely across the width of the fabric. The adjacent inner edges of the top plates 40 and 41 are spaced to form a straight parallel-sided slot 42 which is extended downwardly into the upper face of the H-beam 39. The trunnions 33 are secured to opposite ends of the H-beam.

Figure 3:
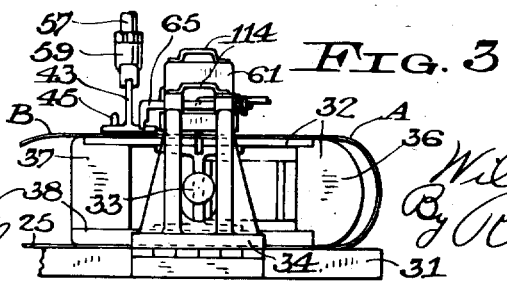
Fig. 3 is an end elevation of the apparatus.
Figure 4:
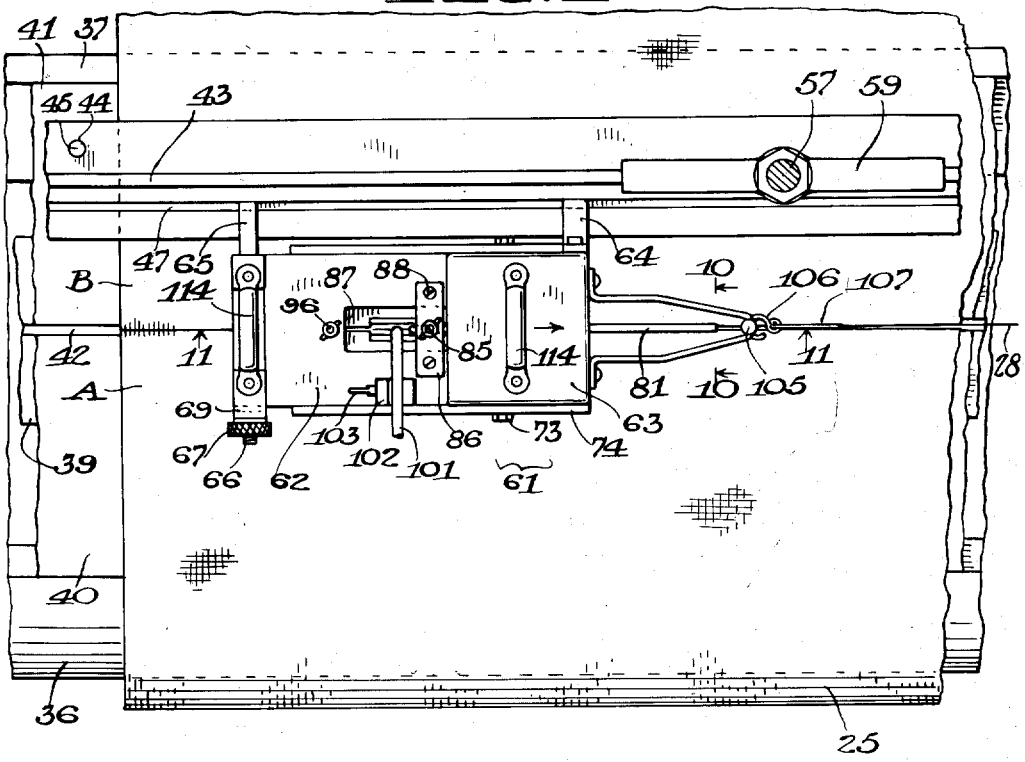
Fig. 4 is a top plan view of a part of the apparatus, parts being broken away and parts being shown in section.

As seen in Figs. 3 and 4, the cloth end B rests on the rear top plate 41 of the beam, and the cloth end A is curled upwardly over the front stringer of the beam and rests on the front top plate 40 of the beam. The cloth end B is clamped against the top plate 41 by a movable clamping bar 43, here shown to be a T-bar, extending parallel to the beam. Near its opposite ends the clamping bar 43 is provided in its bottom flange with openings 44 to receive locating pins 45 upstanding from the beam top plate 41, so that the bar will extend parallel to the slot 42 in the beam, and the beam and clamping bar together will constitute a base for supporting the fabric and for supporting and guiding a welding or soldering carriage in its motor driven travel entirely across the fabric. The bottom flange of the bar is provided with a facing 46 of felt or other suitable material to engage the cloth. The clamping bar is also provided in its upper face and near its front edge wtih a track-forming guide channel 47 extending parallel to the slot 42, the purpose of the channel being to guide the carriage as hereinafter explained.

Figure 6:
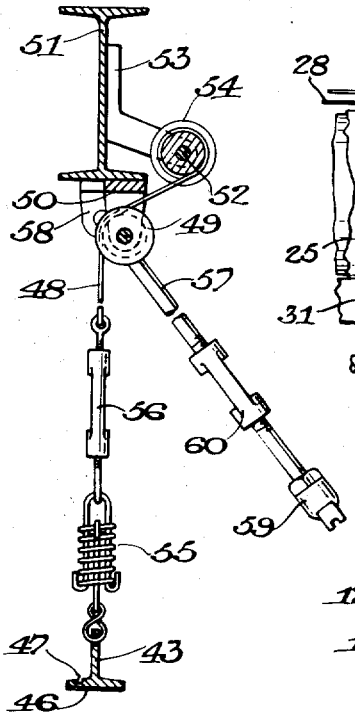
Fig. 6 is a transverse sectional elevation of cloth-clamping means forming part of the apparatus, a clamping strut thereof being swung out of clamping position.

The clamping bar 43 is suspended by a plurality of cables 48 passing over pulleys 49 carried on brackets 50 secured to an overhead beam or other support 51. A horizontal shaft 52 is journalled in brackets 53 secured to the support and has flanged winding drums 54 fast thereon for receiving the upper ends of the cables. By rotating the shaft 52 the clamping bar may be raised or lowered. The lower ends of the cables are attached to the upstanding flange of the clamping bar 43 by extensible spring mountings 55, and the cables are adjusted as to length by turnbuckles 56. The clamping bar is urged downwardly and retained in clamping position by a plurality of extensible struts 57 pivotally mounted at their upper ends in brackets 58 secured to the support 51 and having grooved lower heads 59 engageable with the upper edge of the upstanding flange of the clamping bar. Each clamping strut 57 is provided with a turnbuckle 60 for applying the clamping pressure. When the cloth end B is clamped in position, the edge thereof projects over the slot 42 in the base beam 32 approximately one-half the width of the slot. When the struts 57 are not in use they can be swung out of the way, as seen in Fig. 6, being retained in their angular position by their frictional engagement with the brackets 58.

A carriage 61 is provided for urging together and clamping the cloth ends A and B and for supporting heating means for fusing the joint in the cloth. The carriage comprises a rectangular metal frame 62 having a weight block 63 at its front end. At one side the frame is provided with downwardly hooked front and rear outriggers 64 and 65 which slidably fit in the guide channel 47 in the cloth-clamping bar 43. The rear outrigger 65 has a rod 66 slidably mounted in the frame for relative movement transversely of the frame and is adjustable by a knurled nut 67 threaded on the rod and having an annular groove 68 for a retainer 69.

Figure 5:
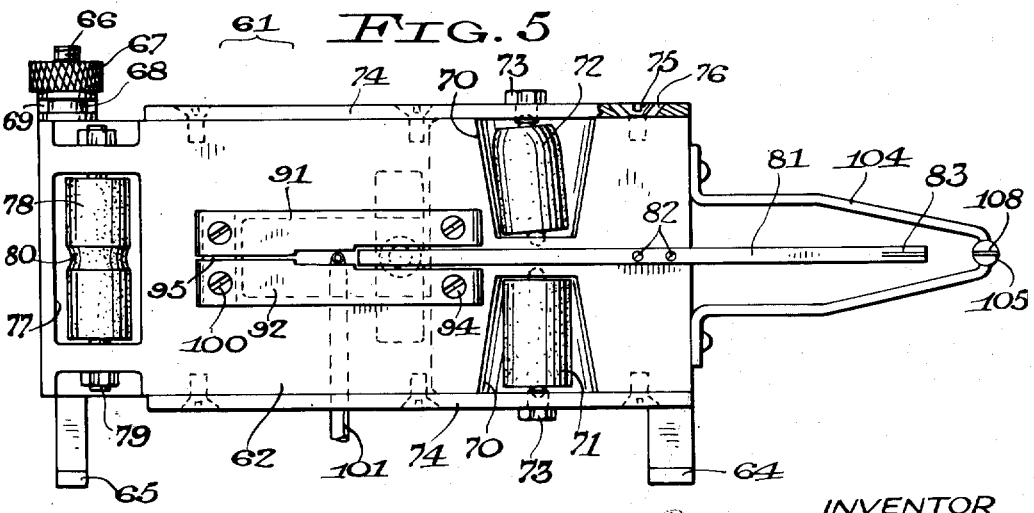
Fig. 5 is a bottom plan view of a carriage forming part of the apparatus.

The bottom face of the carriage frame is formed with a pair of pockets 70 near its front end in which rollers 71 and 72 are disposed, the rollers having a resilient tread of rubber or other suitable material. The roller 71 is engageable with the upper surface of the cloth end B and is rotatable on a horizontal axis susbtantially perpendicular to the direction of travel of the carriage. The roller 72 is engageable with the upper surface of the cloth end A and is mounted in skewed position, the outer end of this roller being to the rear of the inner end and being rounded, as seen in Fig. 5. At their outer ends the rollers are journalled in screws 73 secured in longitudinally adjustable bars 74 fastened to the opposite sides of the carriage frame by screws 75 passing through slots 76 in the bars. During the travel of the carriage, the effect of the skewed roller 72 is to urge the cloth end A toward the cloth end B, the end edges of the cloth ends being brought into forcible engagement with each other or with the interposed strand 28 when this strand is used.

A pocket 77 is formed in the bottom face of the carriage frame near the rear end thereof and has mounted therein a roller 78 having a resilient tread of rubber or other suitable material. The roller 78 is journalled on a spindle 79, the axis of which is substantially perpendicular to the direction of travel of the carriage. The roller 78 is engageable with the upper surface of both cloth ends A and B after they have been joined, as hereinafter described. An annular groove 80 is formed about the roller 78 to clear the fused joint in the cloth.

Figure 10:
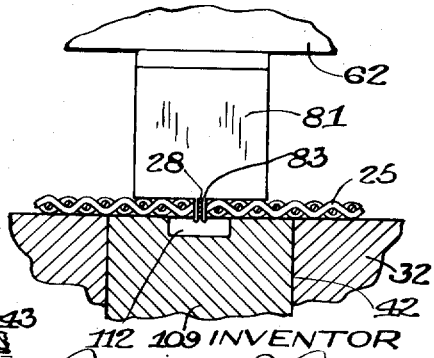
Fig. 10 is a detail sectional view taken on the line 10—10 of Fig. 4.
Figure 11:
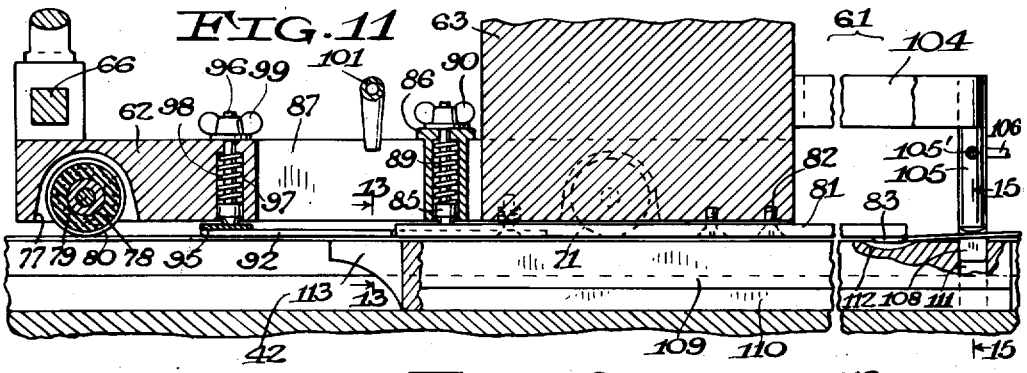
Fig. 11 is a sectional elevation showing the carriage, taken on the line 11—11 of Fig. 4.
Figure 12:
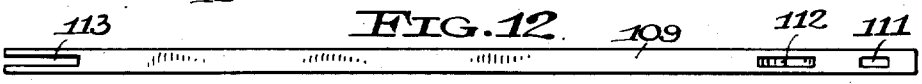
Fig. 12 is a detail top view of a follower for use with the carriage.
Figure 16:
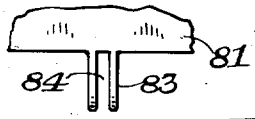
Fig. 16 is a detail front end view of the cloth clamping bar shown in Fig. 10.

A spring bar 81 extends centrally and longitudinally of the bottom face of the carriage frame 62 and is secured by screws 82 or otherwise to the front portion of the frame. The spring bar projects forwardly of the frame and is provided at its front end with a pair of thin parallel downwardly projecting flanges 83 (Figs. 10, 11, and 16) forming between them a narrow guide channel 84 for the ribbon 28. The spring bar 81 extends rearwardly from the attaching screw 82 and between the rollers 71 and 72 and its free end is urged downwardly by a vertical plunger 85 (Fig. 11). The plunger 85 is slidably mounted in a housing 86 disposed in an opening 87 formed in the carriage frame, the housing being secured to the upper face of the frame by screws 88. A coiled spring 89 in the housing surrounds the plunger and urges it downwardly, the limit position of the plunger being adjusted by a wing nut 90 threaded on the reduced upper end of the plunger. The spring bar 81 directly overlies the slot 42 in the base beam 32.

Figure 13:
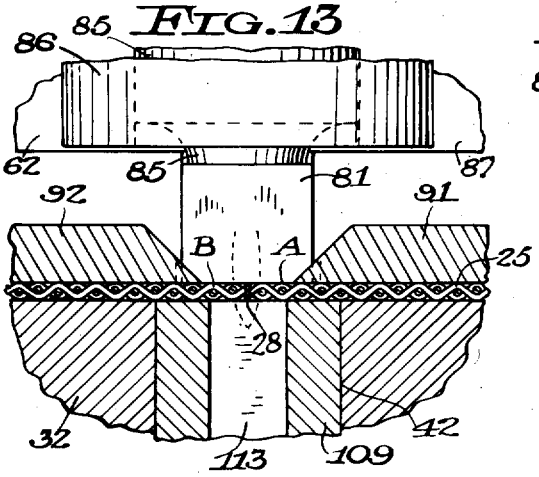
Fig. 13 is a detail sectional view taken on the line 13—13 of Fig. 11.
Figure 14:
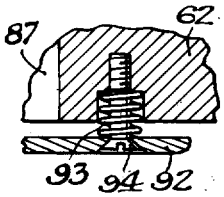
Fig. 14 is a detail sectional view of a spring mounting for one of the heat-guarding plates attached below the carriage.

Closely flanking the rear end portion of the spring bar 81 and extending rearwardly therefrom are a pair of parallel heat-guarding plates 91 and 92 (Figs. 5, 11 and 13) engageable with the upper surface of the cloth ends A and B. The front ends of the heat-guarding plates are urged downwardly by coiled springs 93 surrounding adjustable limit screws 94 (Figs. 5 and 14) threaded into the bottom face of the carriage frame. At their rear ends the heat-guarding plates are connected by a cross-piece 95 urged downwardly by a vertical plunger 96 slidably passing through a bore 97 in the carriage. A coiled spring 98 in the bore surrounds the plunger and urges it downwardly, the limit position of the plunger being adjusted by a wing nut 99 threaded on the reduced upper end of the plunger, and the lower limit position of the plates 91 and 92 being determined by adjustable limit screws 100 threaded into the bottom face of the carriage frame. A suitably regulated heating torch 101 is detachably mounted in a yoke 102 (Figs. 4 and 19) on the carriage frame and is held in position by a wing screw 103 and forms a heat applicator adjacent to the interposed strip. The torch has a downturned discharge end for directing a fusing flame through the opening 87 in the frame and between the heat-guarding plates 91 and 92 to impinge on the abutted edges of the cloth ends a short distance behind the rear end of the spring bar 81. The spaced inner edges of the heat-guarding plates are beveled, as seen in Fig. 13, so as to provide a downwardly converging trough through which the torch flame passes, only narrow portions of the cloth ends being exposed to the flame which is so regulated as to furnish sufficient heat to fuse the strip to the fabric without making objectionable changes in the molecular structure thereof. The heat-guarding plates 91 and 92 constitute means for slidably engaging the surface of the fabric on each side of the joint and form heat conducting blocks to draw heat from the fabric edges beyond the joint to prevent overheating. As seen in Fig. 5, the plate-spacing is narrower adjacent the flame than at the front portions of the plates, and the rear portions of the plates are spaced to form a narrow slot.

Figure 15:
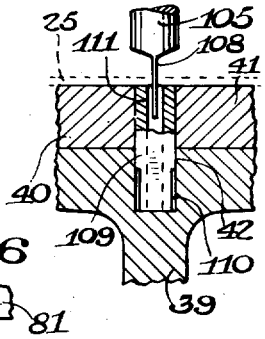
Fig. 15 is a detail sectional view taken on the line 15—15 of Fig. 11.

The front end of the carriage frame has secured thereto a forwardly projecting bracket 104 (Fig. 11) on which a downwardly projecting stem 105 is carried. The stem 105 has a transverse opening 105' to detachably receive a hook 106 of a traction cord or cable 107 hereinafter referred to, and the lower end of the stem has a thin blade 108 which passes between the spaced end edges of the cloth ends. A follower bar 109 is slidably mounted in the slot 42 of the base beam 32 and underlies the carriage, the bar having a flat top face flush with the top surface of the plates 40 and 41, and having relieved lower side walls 110, as seen in Fig. 15. Near its front end the bar 109 has a vertical slot 111 for receiving the blade 108 which forms a driver or coupling member for the bar. A recess 112 in the top face of the bar provides clearance for the lower edges of the channel-forming flanges 83 on the spring bar 81. The bar 109 is cut away at its lower rear end and a vertical slot 113 in the bar opens at the rear end of the bar and provides clearance for the flame tip. The carriage frame is equipped with handles 114 to facilitate the placement and removal of the carriage and its coupling and uncoupling with respect to the follower bar. The carriage and its follower bar together form a cloth-pressing member of movable, separable, upper and lower portions which are translatable as a unit, and the beam 32 forms supporting means for these members. In this cloth-pressing member the follower bar 109 is adapted to engage the underside of the wire fabric, as it is passed thereacross and beneath the contacting ends thereof and the carriage portion engages the upper side of the fabric and is movable with the follower bar as a unit.

Figure 1:
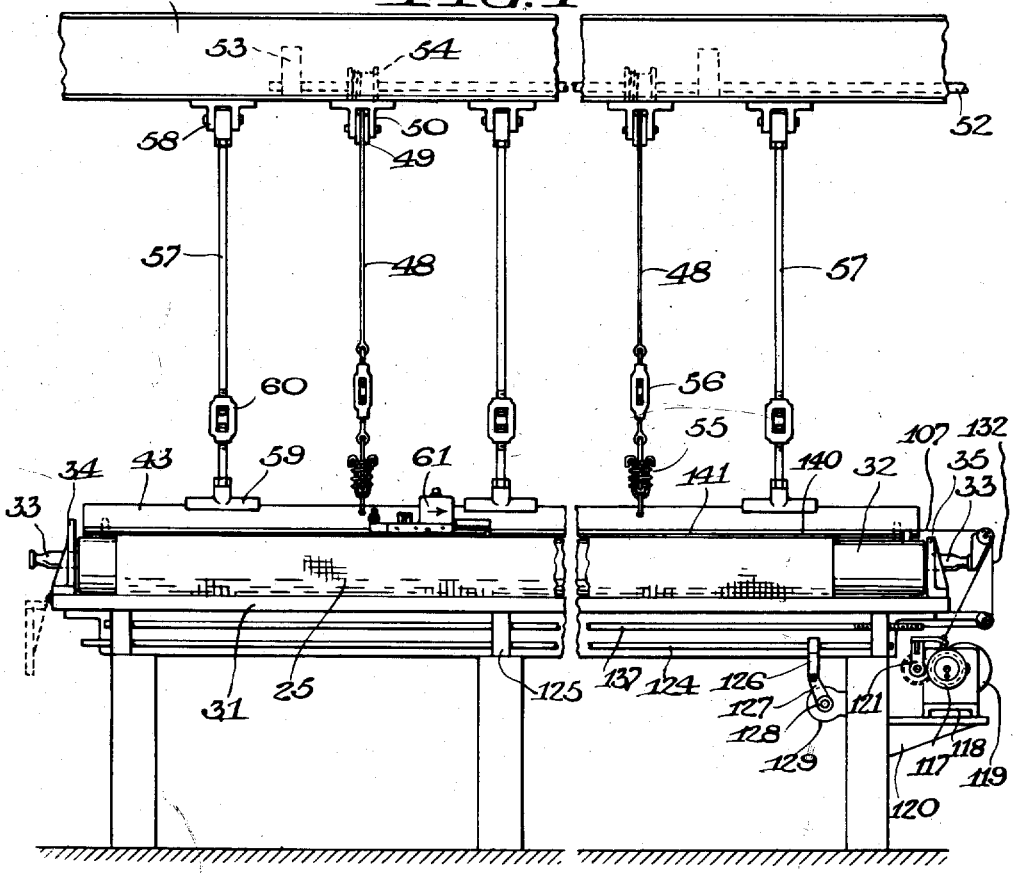
Fig. 1 is a front elevation of an apparatus constructed in accordance with the invention and for carrying out the method of the invention, parts being broken away.
Figure 2:
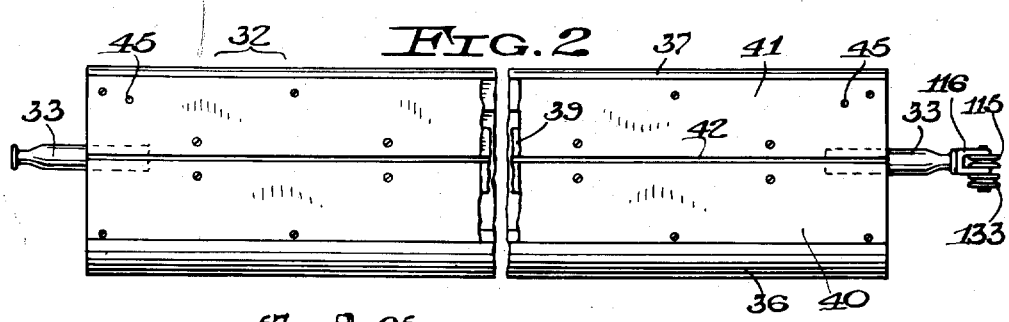
Fig. 2 is a top plan view of a base member forming part of the apparatus, parts being broken away.
Figure 7:
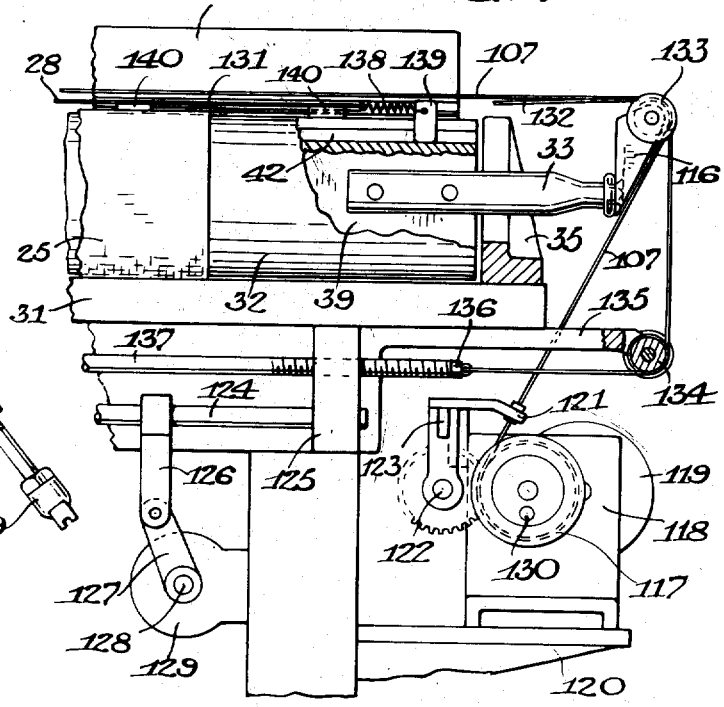
Fig. 7 is an elevation of the finishing end of the apparatus, parts being broken away and parts being shown in section.
Figure 8:
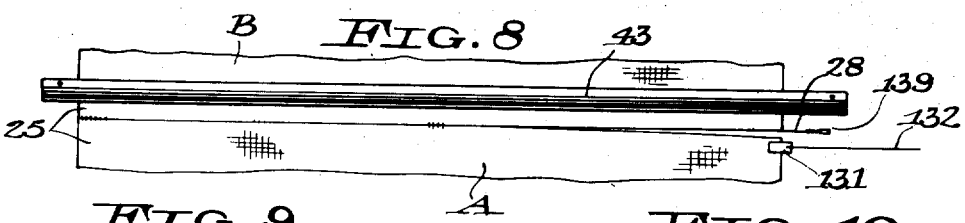
Fig. 8 is a diagrammatic top plan view of the cloth and its clamping and tensioning means, a part of the joint having been made.
Figure 9:
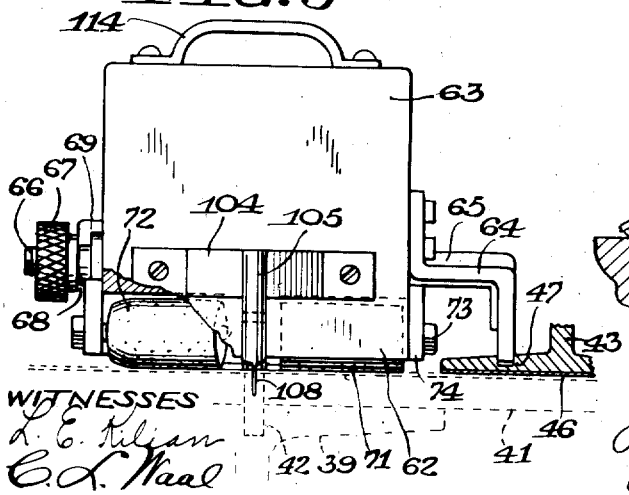
Fig. 9 is a front end view of the carriage, parts being broken away and parts being shown in section.

The traction cord or cable 107 for the carriage passes over a pulley 115 (Figs. 1 and 7) rotatably mounted on a bracket 116 secured to the trunnion 33 at the finishing end of the base beam 32, and is fastened to a slow speed winding drum 117. The drum 117 is driven through a transmission 118 by an adjustable speed electric motor 119, the transmission and motor being supported on a bracket 120 secured to the table 31. The drum 117 is preferably of the level winding type, the cord being guided by a traveller 121 advanced by a suitably driven screw shaft 122 and slidable on a stationary guide bar 123. A horizontal control rod 124 extends along the front of the table 32 and is axially slidable in brackets 125 secured to the table. An arm 126 on the control rod is pivoted to an arm 127 on a rock shaft 128 connected to a suitable motor speed controller 129. The operator may thus control the speed of the motor while he is located at any point along the front of the table. The winding drum has a releasable ratchet 130 to permit hand rotation of the drum when arranging the apparatus for use. The motor driven drum 117 and its cable 107 and associated parts forms a mechanism for moving the carriage and the torch welding or soldering means longitudinally of the joint at a substantially uniform velocity.

In order to insure registration of the selvages of the cloth ends at the finishing end of the joint, especially in the case of wide cloth, the cloth end A is placed under adjustable tension by a removable clamp 131 (Fig. 7) attached to a tensioning cord or cable 132. The cord 132 passes over a pulley 133 on the trunnion bracket 116 and is wound over a spool 134 on a bracket 135 secured to the table 31. From the spool 134 the cord extends to and is fastened on a swivel 136 on the end of a screw-threaded control shaft 137 extending along the front of the table and passing through the table brackets 125 in parallel relation to the control rod 124. The shaft is screwed through one of the brackets so that rotation of the shaft, by turning the control shaft 137 by hand, will increase or decrease the tension on the cloth. The operator may effect such rotation while he is located at any point along the front of the table. The tensioning of the cloth serves to avoid waves, slack spots, or unevenness along the joint.

The solder-covered ribbon 28 extends along the cloth edges to be joined, one end of the ribbon being solder-tacked at the starting end of the joint and the other end being attached to a light coiled spring 138 (Fig. 7) connected to a fibre block 139 removably wedged into the slot 42 in the base beam 32. The ribbon is held taut and is supported above the cloth at intervals by shiftable plates 140. The ribbon passes alongside of the thin blade 108 on the front bracket of the carriage and passes into the guide channel 84 to a position between the end edges of the cloth ends A and B. The plates 140 as well as other shiftable plates 141 serve to temporarily hold the cloth end A down on the top surface of the beam until the carriage arrives.

Figure 19:
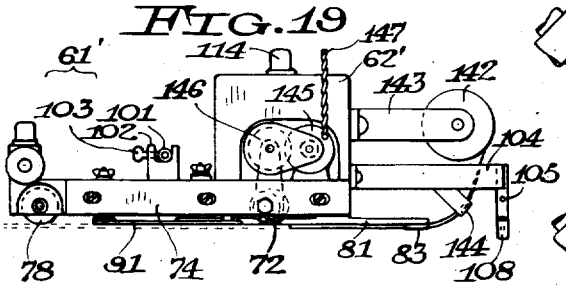
Fig. 19 is a side elevation of a modified form of carriage.

In the modified form the carriage 61′ shown in Fig. 19 forms a strip laying unit and the ribbon is fed from a reel 142 pivotally mounted on a bracket 143 secured to the front end of the carriage frame 62′. The ribbon passes against a guide 144 on the carriage frame and then enters between the flanges 83 of the spring bar 81. The reel is frictionally retarded to insure the proper feed. The carriage may be advanced by the traction cord or by an adjustable speed motor 145 mounted on the carriage and driving one or more of the rollers or other traction members through a speed-reducing transmission 146, the motor being supplied with current through a drop cord 147. Otherwise the modified form of carriage shown in Fig. 19 is like the one shown in other figures of the drawings. The reel of fusible material in strip form is supported on the upper or carriage portion of the cloth-pressing member and positioned thereon so as to feed the strip into the work as the strip is moved across the fabric while the torch also carried by the carrier applies heat progressively to the strip as the cloth-pressing member is moved across the fabric.

When the apparatus is to be placed in use, the length of cloth 25 is placed on the table 31 with the cloth end A overhanging the front edge of the table, the beam 32 being then absent. This beam is thereupon lowered onto the cloth, the beam trunnions 33 being located by the slotted brackets 34 and 35. The cloth end B is then placed on the top plate 41 of the beam, and is clamped in position by the clamping bar 43 which is located by the pins 45, the end edge of the cloth lying about midway along the slot 42 in the beam. The spring mountings 55 hold the clamping bar slightly above the cloth until the strut turnbuckles 60 are operated. The cloth end A is then brought onto the beam top plate 40 and is soldered at one selvage to the cloth end B, the solder-bearing ribbon being thereby tacked in place. The ribbon is then strung along and above the slot 42 and is secured at its other end to the fibre block 139. The follower bar 109 is placed in the slot 42 and the carriage 61 is lowered onto the cloth, the front blade 108 thereof entering between the cloth edges and into the slot 111 of the follower bar. The ribbon 28 is entered into the guide channel 84 of the spring bar 81 of the carriage, and the outriggers 64 and 65 of the carriage are entered into the guide channel 47 of the clamping bar 43. The traction cord 107 is hooked onto the carriage, and the tensioning cord 132 is attached to cloth end A at the finishing end of the beam. The winding motor 119 is then started in operation and adjusted as to speed by the control rod 124. The torch is then lighted and clamped on the carriage and as the carriage advances the torch flame impinges on the solder-covered ribbon and the cloth edges abutting against the ribbon, causing the fusible metal to melt and to firmly unite the cloth edges to the ribbon core. At the time of fusion, the cloth edges have been forcibly brought into abutment by the action of the skewed roller 72 on the carriage. If desired, the operator may assist this action by manually pressing the cloth end A toward the clamped cloth end B. The spring bar 81 and the heat-guarding plates 91 and 92 hold the cloth down against the beam top plates 40 and 41 and the follower bar 109 so as to maintain the pressure abutment of the cloth edges and to prevent disarrangement of the cloth and ribbon. The carriage travels with substantially uniform velocity entirely across the cloth at a suitable rate of speed, the clamping and fusing proceeding continuously and progressively. Only a small section of the cloth is being clamped at any instant so as to insure firm abutment and to avoid loose warp ends. As the carriage advances, tension may be applied to the cloth end A by turning the control shaft 137, thus avoiding waviness or unevenness in the cloth along the joint, and insuring registration of the selvages at the finishing end of the joint. The tensioning can also be used to obtain registration of the warp ends. In the joint, only a thin film of fusible metal remains between the closest parts. While the warp ends of the fabric parts are shown to be in register, it is not essential that they have this relation. The relatively hard metal of the core or carrier prevents overlapping of the warp ends. The fusible metal in the joint does not flow far from the core, thus avoiding filling of the adjacent cloth meshes with fusible metal even with fine fabrics of 60 to 100 mesh. The core of the solder-bearing strand also forms a heat-absorbing mass of metal preventing excessive heating of the end weft wires. When the joint is completed, the flame is shut off and the winding motor is stopped. The carriage is lifted off after dismounting the torch, and the projecting end of the ribbon 28 is cut off. The clamping bar 43 is then released from the cloth and the cloth is lifted from the beam 32 to permit endwise removal of the beam, the hinged bracket 34 being swung downwardly to the dotted line position of Fig. 1 to facilitate such removal. The cloth is then rolled up and removed. If desired, the joint may be subsequently rolled.

The solder of the ribbon when fused is uniformly deposited along the edges of the cloth. The meshes which are left between the strand and the adjacent end weft wires are sufficiently large to insure proper drainage. The cut ends of the warp wires are covered by the fused metal, thus producing smoothly rounded surfaces on which pulp particles will not become lodged. When the interposed strand is used, the edges thereof are adjacent the surface planes of the fabric where they present wearing surfaces to rub on suction boxes or other supports, thus avoiding excessive wear on the knuckles adjacent the joint, and increasing the service life of the fabric.

The method and apparatus of the invention can be used for joining various wire fabrics, but are more particularly intended for the joining of wire cloth used as Fourdrinier wires, and the like. If desired, the method and apparatus can be used for joining fabric parts cut on a bias.

While in the case of a soldered joint it is preferred to use a solder-covered strand, it is also possible to produce a satisfactory soldered joint using a strand formed entirely of solder.

What I claim as new and desire to secure by Letters Patent is:

1. The method of producing a joint in wire cloth, which consists in holding two cloth ends in adjacent relation with their edges spaced apart, progressively guiding a strand to a position between said edges, progressively bringing the cloth edges against said strand, and uniting the cloth edges and interposed strand by the application of heat.

2. The method of producing a joint in flexible wire cloth, which consists in bringing together the edges of the cloth portions to be joined, tensioning one cloth portion in a direction substantially parallel to its edge to remove waviness therefrom, and uniting the edges by the application of heat while the tensioning is maintained.

3. Apparatus for use in uniting the edges of wire cloth, comprising means for positioning cloth portions with their edges adjacent, a carriage movable along the cloth edges, and skew-mounted roller means on the carriage engageable with at least one cloth portion for bringing the cloth edges together.

4. Apparatus for use in uniting the edges of wire cloth, comprising means for positioning cloth portions with their edges adjacent, a carriage movable along the cloth edges, and resiliently mounted cloth-engaging means on said carriage straddling the cloth edges for holding said edges in facing relation.

5. Apparatus for use in uniting the edges of wire cloth, comprising means for positioning cloth portions with their edges adjacent, a cloth-engaging carriage supported on said cloth portions adjacent the cloth edges and movable along the cloth edges, and heating means movable with the carriage for uniting the cloth edges.

6. Apparatus for use in uniting the edges of flexible wire cloth, comprising means for positioning cloth portions with their edges adjacent and in facing relation, means for tensioning one of said cloth portions in a direction substantially parallel to the cloth edges to remove waviness from the cloth edge, and means for uniting the edges by the application of heat while the tensioning is maintained.

7. Apparatus for use in uniting the edges of wire cloth, comprising means for positioning cloth portions with their edges adjacent, a cloth-engaging carriage movable along the cloth edges, and means for advancing said carriage including a traction cord.

8. Apparatus for use in uniting the edges of wire cloth, comprising a carriage movable along the edges of cloth portions to be joined, and means for introducing a strand between the cloth edges and including a strand-supplying member on the carriage.

9. Apparatus for use in uniting the edges of wire cloth, comprising a support for receiving cloth portions with their edges adjacent, said support having a channel along which the cloth edges extend, a carriage movable along the cloth edges and having a coupling member extending between the cloth edges and into said channel, and a cloth engaging follower in said slot connected by said coupling member for movement with said carriage.

10. Apparatus for use in uniting the edges of wire cloth, comprising means for positioning cloth portions with their edges adjacent, a carriage movable along the cloth edges, and resiliently mounted plates engageable with the cloth and carried by said carriage.

11. Apparatus for use in uniting the edges of wire cloth, comprising a support on which cloth portions are positioned with their edges adjacent, a movable clamping bar engageable with one of said cloth portions, strut means for applying clamping pressure to said bar, and yieldable suspension means for holding said bar above the cloth when the clamping pressure is released, said suspension means being yieldable downwardly when clamping pressure is applied to said bar by said strut means.

12. Apparatus for use in uniting the edges of wire cloth, comprising means for positioning cloth portions with their edges adjacent, a carriage movable along said cloth, and spaced flanges carried by said carriage and entering between the cloth edges to form a guide channel for a strand to be interposed between said edges.

13. Apparatus for joining the edges of wire cloth, comprising a support for receiving cloth portions with their edges adjacent, a carriage movable along the cloth edges, adjustable speed traction means for the carriage, and means extending along said support for adjusting the speed of said traction means.

14. Apparatus for use in uniting the edges of wire cloth, comprising a support on which cloth portions are positioned with their edges adjacent, a clamping bar engageable with one of said cloth portions, and a cloth-engaging carriage movable along the cloth edges and guided by said bar.

15. Apparatus for use in uniting the edges of wire cloth, comprising a support for receiving cloth portions with their edges adjacent, said support having a slot to underlie said edge portions, a cloth-supporting slide member movable in said slot, and a cloth-pressing carriage movable along the cloth above said slide member.

16. Apparatus for use in uniting the edges of wire cloth, comprising means for positioning cloth portions with their edges adjacent, means for introducing a strand between said edges, and means movable relatively along the cloth for bringing said edges against said strand.

17. Apparatus for use in uniting the edges of wire cloth, comprising a pair of movable members adapted to slidably receive therebetween cloth ends with the cloth edges adjacent, supporting means on which said members are movable, said members being translatable as a unit along the cloth edges, and a pair of laterally spaced projections on one of said members movable between and along the cloth edges to form a guide for a strand to be interposed between the cloth edges.

18. Apparatus for use in uniting the edges of wire cloth, comprising a carriage movable along cloth edges disposed adjacent each other in facing relation, and means on said carriage entering between said cloth edges for guiding a strand to a position between and along said cloth edges.

19. Apparatus for use in uniting the edges of wire cloth, comprising separable upper and lower cloth-pressing members adapted to slidably receive therebetween the thickness of cloth ends with the cloth edges projecting toward each other, supporting means on which said members are movable, means for translating said members as a unit along the cloth edges, and metal-fusing means carried by one of said members for operating on the cloth edges during the travel of said members.

20. Apparatus for use in uniting the edges of wire cloth, comprising separable upper and lower cloth-pressing members adapted to slidably receive therebetween the thickness of cloth ends with the cloth edges projecting toward each other, supporting means on which said members are movable, means for translating said members as a unit along the cloth edges, the upper member being loosely related in vertical direction to the lower member so that the weight of the upper member bears down upon the cloth ends interposed between said members, and metal-fusing means carried by one of said members for operating on the cloth edges during the travel of said members.

21. Apparatus for use in uniting the edges of wire cloth, comprising separable upper and lower cloth-pressing members adapted to slidably receive therebetween the thickness of cloth ends with the cloth edges projecting toward each other, supporting means on which said members are movable, a coupling member extending between the cloth edges and detachably connecting the upper and lower members, means for translating said members as a unit along the cloth edges, and metal-fusing means movable with said upper and lower members for operating on the edges of the cloth beyond the coupling member.

22. A method of making a seam in wire fabric, comprising interposing a strip between the ends of the fabric to be joined, abutting the ends of the fabric against opposite sides of the strip and progressively moving a heat applicator with substantially uniform velocity entirely across the fabric to unite the strip to the fabric.

23. A method of making a joint for wire fabric, comprising interposing a strip containing fusible material between the ends of the fabric to be joined, and positioning a heat applicator adjacent to the interposed strip, and then moving the applicator at a substantially uniform velocity across the entire joint, the applicator being regulated to furnish sufficient heat to fuse the strip to the fabric without making objectionable changes in the molecular structure thereof.

24. A device of the character described, comprising in combination, a flat continuous support for the fabric to be joined, means for slidably engaging the surface of the fabric on each side of the joint, a torch associated with said means, and mechanism for moving the torch longitudinally of the joint.

25. A device of the character described, comprising in combination, a flat continuous support for the fabric to be joined, means for slidably engaging the surface of the fabric on each side of the joint, a welding or soldering means associated with said last named means, and means for moving said welding or soldering means longitudinally of the joint.

26. A method of making a seam in wire fabric, comprising bringing together the ends of the fabric to be joined, against the opposite sides of an interposed strand, and progressively moving a heat applicator with substantially uniform velocity entirely across the fabric to unite the ends and the strand together.

27. An apparatus for making a seam in wire fabric comprising a carriage, means for supporting the carriage for movement along the fabric, heat conducting blocks and a heat applicator movable with the carriage, and an electric motor for operating the carriage with uniform velocity across the fabric, whereby the heat applicator unites the strand to the edges while the carriage is in motion.

28. A device for making seams in wire fabric, comprising in combination, a base having a guideway therein, a strip laying unit movably mounted in the guideway, an electric motor and means for operatively connecting the motor to the unit to move it with a uniform velocity across the fabric.

29. In a device of the character described, the combination with a member, which is adapted to engage the underside of wire fabric, as it is passed thereacross and beneath the contacting ends thereof, said member having a portion thereof engaging the upper side of the fabric and movable therewith as a unit, a reel of material in strip form supported on the upper portion of said member and positioned thereon, so as to feed the strip into the work as the strip is moved across the fabric and means also carried by the upper part of said member for applying heat progressively to the strip as the member is moved across the fabric.

WILLIAM E. BUCHANAN.